(12) United States Patent
Yamamoto et al.

(10) Patent No.: US 8,927,860 B2
(45) Date of Patent: Jan. 6, 2015

(54) ELECTRICAL JUNCTION BOX

(71) Applicant: Yazaki Corporation, Tokyo (JP)

(72) Inventors: Masaki Yamamoto, Makinohara (JP); Kazutoshi Kurachi, Makinohara (JP); Kei Tomita, Makinohara (JP)

(73) Assignee: Yazaki Corporation, Tokyo (JP)

( * ) Notice: Subject to any disclaimer, the term of this patent is extended or adjusted under 35 U.S.C. 154(b) by 38 days.

(21) Appl. No.: 13/941,699

(22) Filed: Jul. 15, 2013

(65) Prior Publication Data
US 2014/0041928 A1 Feb. 13, 2014

(30) Foreign Application Priority Data
Aug. 10, 2012 (JP) ................................. 2012-177901

(51) Int. Cl.
H02G 3/08 (2006.01)
H02G 3/22 (2006.01)
H02G 3/14 (2006.01)

(52) U.S. Cl.
CPC . *H02G 3/22* (2013.01); *H02G 3/14* (2013.01); *Y10S 248/906* (2013.01)
USPC ............................. 174/50; 439/535; 248/906

(58) Field of Classification Search
USPC ............. 174/50; 220/4.02; 439/535; 248/906
See application file for complete search history.

(56) References Cited

U.S. PATENT DOCUMENTS

| 7,781,684 B2 * | 8/2010 | Stuckmann et al. | 174/650 |
| 8,552,293 B2 * | 10/2013 | Tolbert, Jr. | 174/50.5 |
| 8,702,446 B2 * | 4/2014 | Gonzalez | 439/535 |

FOREIGN PATENT DOCUMENTS

| JP | 2001-211528 A | 8/2001 |
| JP | 2002-017025 A | 1/2002 |

* cited by examiner

*Primary Examiner* — Dhirubhai R Patel
(74) *Attorney, Agent, or Firm* — Edwards Wildman Palmer LLP

(57) ABSTRACT

An electrical junction box includes: a case main body provided with a wire receiver for receiving an end of an electric wire at a lower surface side; and a lower cover for covering the lower surface. Further, the electric wire is routed in between the lower surface of the case main body and the lower cover, and guided out from a wire outlet composed of a notch and a projecting piece. A biting prevention piece is projected from an edge of the lower cover toward the lower surface. A receiving groove for receiving the biting prevention piece is provided on an inside of a peripheral wall of the case main body. After the tip of the biting prevention piece pushing aside the electric wires to an inside of the case main body is inserted into the receiving groove, the lower cover is attached to the case main body.

2 Claims, 3 Drawing Sheets

ELECTRICAL JUNCTION BOX

CROSS REFERENCE TO RELATED APPLICATIONS

This application is on the basis of Japanese Patent Application No. 2012-177901, the contents of which are hereby incorporated by reference.

TECHNICAL FIELD

The present invention relates to an electrical junction box having a case main body provided with an electric wire receiving portion, and a cover attached to the case main body.

BACKGROUND ART

There are various structures for an on-vehicle electrical junction box. For example, an electrical junction box 301 shown in FIG. 3 includes: a case main body 302 of which a lower surface 302a is provided with a wire receiver 305 for receiving an end of an electric wire 304, and of which an upper surface 302b is provided with a component attachment to which a relay or a fuse is attached; a lower cover 303 for covering the lower surface 302a; and an upper cover (not shown) for covering the upper surface 302b. The electric wire 304 is routed between the lower surface 302a and the lower cover 303.

A notch 335 is provided on a peripheral wall of the lower cover 303. The case main body 302 is provided with a projecting piece 325 positioned in the notch 335 and composing a wire outlet together with the notch 335. Further, the electric wire 304 of which end is received in the wire receiver 305 is routed between the lower surface 302a and the lower cover 303, and guided out through the wire outlet.

In such an electrical junction box 301, when the lower cover 303 is attached to the case main body 302, there is a fear that the electric wire 304 may be bitten between the case main body 302 and the lower cover 303. Further, a portion C surrounded by dot line in FIG. 3 is a place where the case main body 302 is bent at a right angle, and the electric wire 304 is subject to be bitten at this place.

For preventing the electric wire from being bitten, in PTL 1, a wire biting prevention structure is proposed in which before the lower cover is attached to the case main body, the electric wire is pushed toward the case main body using an arch-shaped wire bundling member, and in this condition, the lower cover is attached to the case main body.

Further, for preventing the electric wire from being bitten, in PTL 2, a wire biting prevention structure is proposed in which prevention walls are projected from both sidewalls of the case main body for preventing the electric wire from being extruded out from both sidewalls.

CITATION LIST

Patent Literature

PTL 1: JP, A, 2001-211528
PTL 2: JP, A, 2002-17025

SUMMARY OF INVENTION

Technical Problem

However, in the wire biting prevention structure described in PTL 1, because the wire bundling member is used, there is a problem that the number of components is increased, and the assembling man-hours are increased. Further, in wire biting prevention structure described in PTL 2, because the prevention walls are projected at the case main body side, when the electric wire is inserted into the wire receiver of the case main body, the prevention walls become obstructions, and there is a problem that the insertion operation is difficult.

Accordingly, an object of the present invention is to provide an electrical junction box making the wire insertion operation into the wire receiver of the case main body easy, and preventing the wire from being bitten without increasing the number of components.

Solution to Problem

For achieving the object, according to a first aspect of the present invention, there is provided an electrical junction box including:

a case main body of which one surface is provided with a wire receiver for receiving an end of an electric wire and of which an inside of a peripheral wall is provided with a receiving space for receiving a biting prevention piece; and a cover for covering the one surface, the biting prevention piece projecting from an edge of the cover toward the one surface, wherein the electric wire is routed in between the one surface and the cover, and wherein after a tip of the biting prevention piece is inserted into the receiving space, the cover is attached to the case main body.

According to a second aspect of the present invention, there is provided the electrical junction box as described in the first aspect, wherein the receiving space is a receiving groove defined by an inner surface of the peripheral wall and the other surface of the case main body.

According to a third aspect of the present invention, there is provided the electrical junction box as described in the first or second aspect, wherein a line connecting a wire inlet of the wire receiver and a wire outlet of the case main body passes through an outside of the case main body, and wherein the receiving space is provided around the line which is outside of the case main body.

Advantageous Effects of Invention

According to the invention described in the first aspect, the biting prevention piece is projected from the edge of the cover toward the one surface, and the receiving space for receiving the biting prevention piece is provided on the inside of the peripheral wall of the case main body. Further, after the tip of the biting prevention piece is inserted into the receiving space, the cover is attached to the case main body. Therefore, when the electric wire is inserted into the wire receiver of the case main body, there is no obstruction and the insertion operation is easy. Further, when the cover is attached to the case main body, the biting prevention piece pushes aside the electric wires. Further, when the biting prevention piece is received in the receiving space in the case main body, the electric wires pushed aside are surely prevented from being extruded out of the case main body. Therefore, an electrical junction box making the wire insertion operation into the wire receiver of the case main body easy, and preventing the wire biting without increasing the number of components can be provided.

According to the invention described in the second aspect, because the receiving space is a receiving groove composed of an inner surface of the peripheral wall and the other surface, when the tip of the biting prevention piece is inserted into the receiving groove, the case main body and the cover are positioned. Further, when the biting prevention piece is further inserted into a rear side of the receiving groove, the caver can be easily attached to the case main body.

According to the invention described in the third aspect, a line connecting a wire inlet of the wire receiver and a wire outlet of the case main body passes through an outside of the case main body, and the receiving space is provided around the outside of the case main body. Therefore, at a place where the electric wire is easily bitten, the electric wire is surely prevented from being bitten.

These and other objects, features, and advantages of the present invention will become more apparent upon reading of the following detailed description along with the accompanied drawings.

DESCRIPTION OF EMBODIMENTS

An electrical junction box according to an embodiment of the present invention will be explained with reference to FIGS. 1 and 2. The electrical junction box is mounted on a vehicle, supplies electric power and transmits signals to on-vehicle electrical devices. Further, in the present invention, a junction block (also referred to as a junction box), a fuse block (also referred to as a fuse box), and a relay block (also referred to as a relay box) are hereinafter generally referred to as an electrical junction box.

Figure 1:
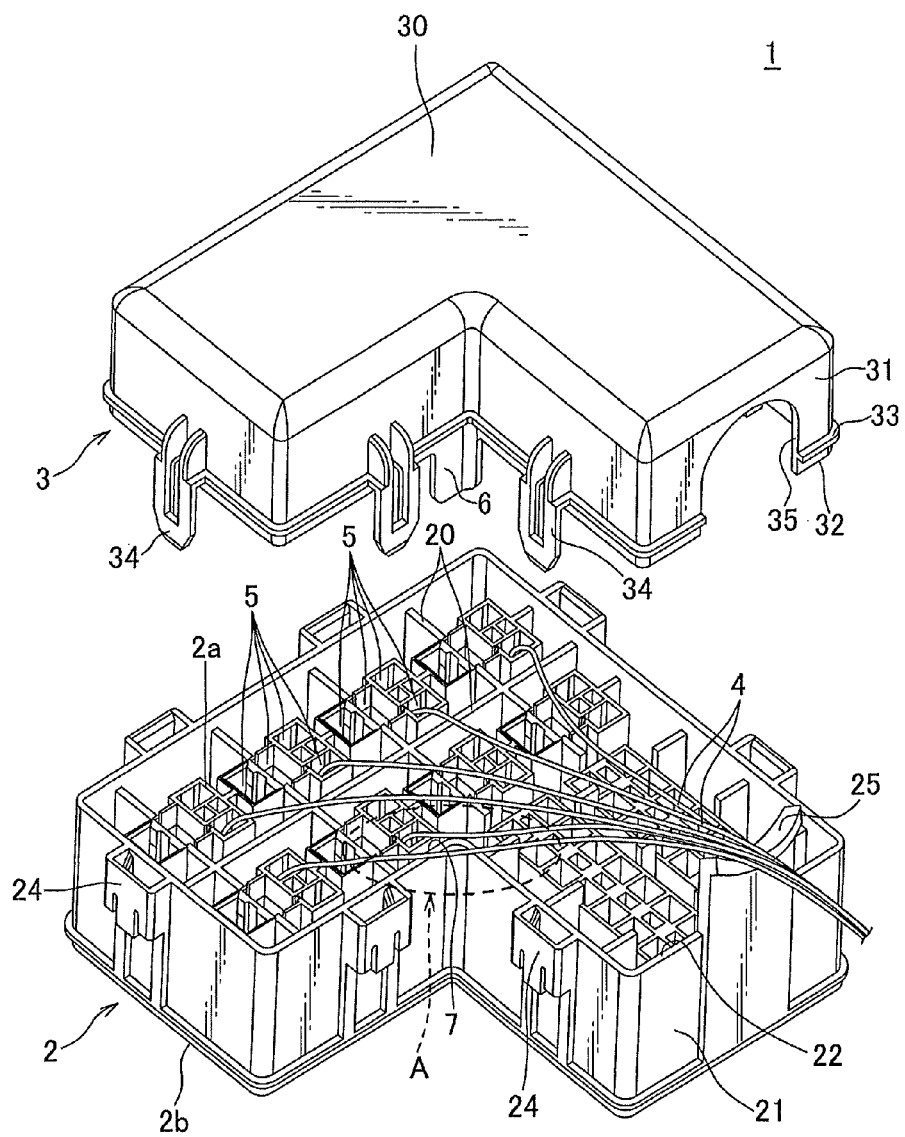
FIG. 1 is an exploded view showing an electrical junction box according to an embodiment of the present invention.

An electrical junction box 1 shown in FIG. 1 includes: a case main body 2; a lower cover 3 (corresponding to a cover in claims) for covering a lower surface 2a of the case main cover 2; an upper cover (not shown) for covering an upper surface 2b of the case main body 2; and electronic components such as a relay or a fuse attached to the upper surface 2b of the case main body 2. Further, the case main body 2, the lower cover 3, and the upper cover are made of synthetic resin.

The case main body 2 includes: a peripheral wall 21 formed in an L-shaped frame; a plurality of locking portions 24 provided on outer surfaces of the peripheral wall 21; a partition wall partitioning an inside of the peripheral wall 21; a component attachment provided on an inside of the peripheral wall 21 and at the upper surface 2b side; a wire receiver 5 provided on an inside of the peripheral wall 21 and at the lower surface 2a side, namely, opposite to the component attachment; a projecting piece 25 projecting from an edge 22 at the lower surface 2a side of the peripheral wall 21; and a receiving groove 7 (corresponding to the receiving space in claims) provided on an inside of the peripheral wall 21 of the case main body 2.

The lower surface 2a of the case main body 2 is a surface surrounded by the edge 22 at the lower cover 3 side of the peripheral wall 21. The upper surface 2b of the case main body 2 is a surface surrounded by an edge at the upper cover side of the peripheral wall 21. Further, the lower and upper surfaces 2a, 2b of the case main body 2 are formed in an L-shape.

The locking portions 24 are provided near the edge 22 at the lower cover 3 side of the peripheral wall 21. Locking arms 34 provided on the lower cover 3 are respectively locked with the locking portions 24.

The component attachment is a portion to which electronic components such as relay or fuse are attached. The wire receiver 5 is a portion for receiving an end of the electric wire 4 and a terminal connected to the end. Further, the terminal connected to the end of the electric wire is electrically connected to a terminal of the electronic component attached to the component attachment. Further, the electric wire 4 of which end is received in the wire receiver 5 is routed in between the lower surface 2a of the case main body 2 and the lower cover 3, and guided out from a later-described wire outlet.

The projecting piece 25 is located in a notch 35 provided on a peripheral wall 31 of the lower cover 3, and composes the wire outlet (corresponding to the wire outlet in claims) together with the notch 35. This projecting piece 25 is provided on a one end of the case main body 2.

The receiving groove 7 receives a biting prevention piece 6 projected from an edge 32 of the peripheral wall 31 of the lower cover 3. This receiving groove 7 is provided on a bent portion (a portion surrounded by dot line A in FIG. 1) of the L-shaped case main body 2, and composed of an inner surface 21a positioned on the bent portion, and a surface 26a of an inner wall 26 opposite to the peripheral wall 21.

Figure 2:
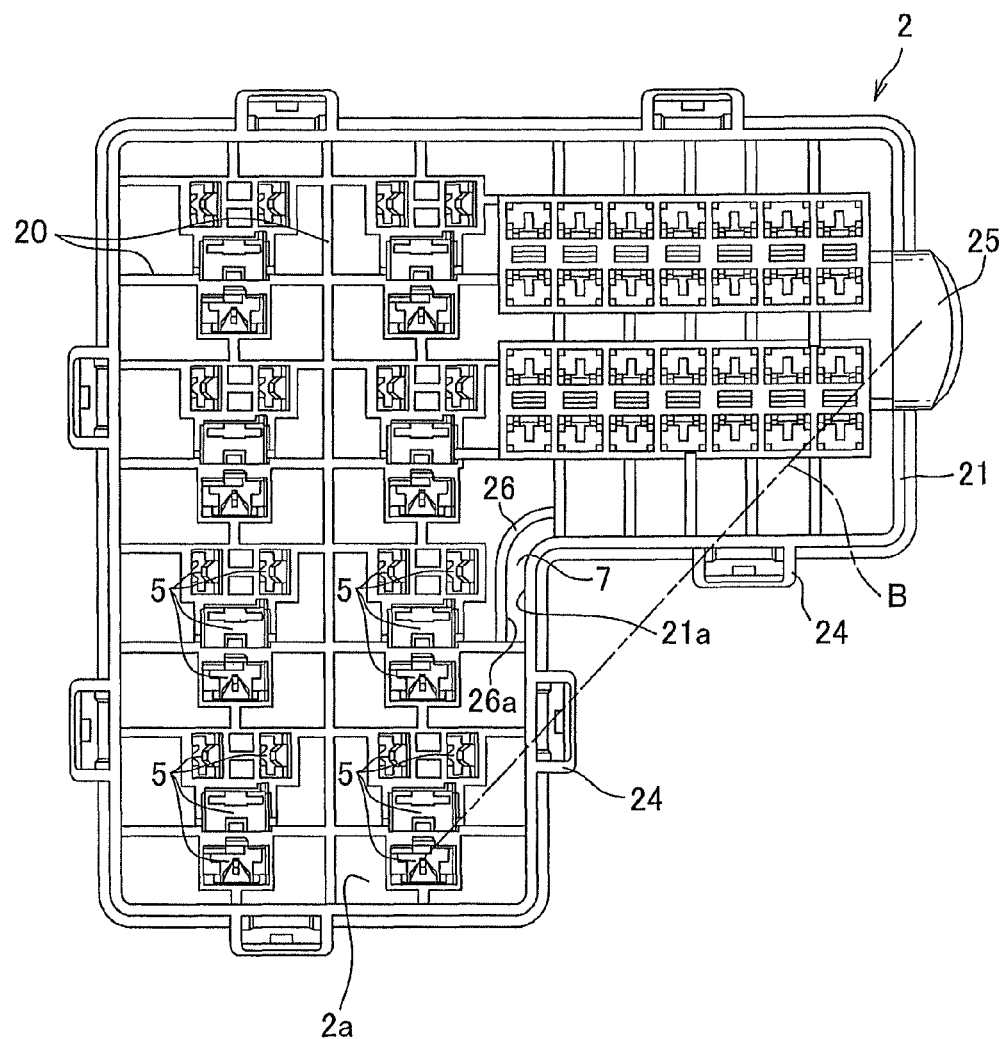
FIG. 2 is a plan view showing a case main body of FIG. 1.
Figure 3:
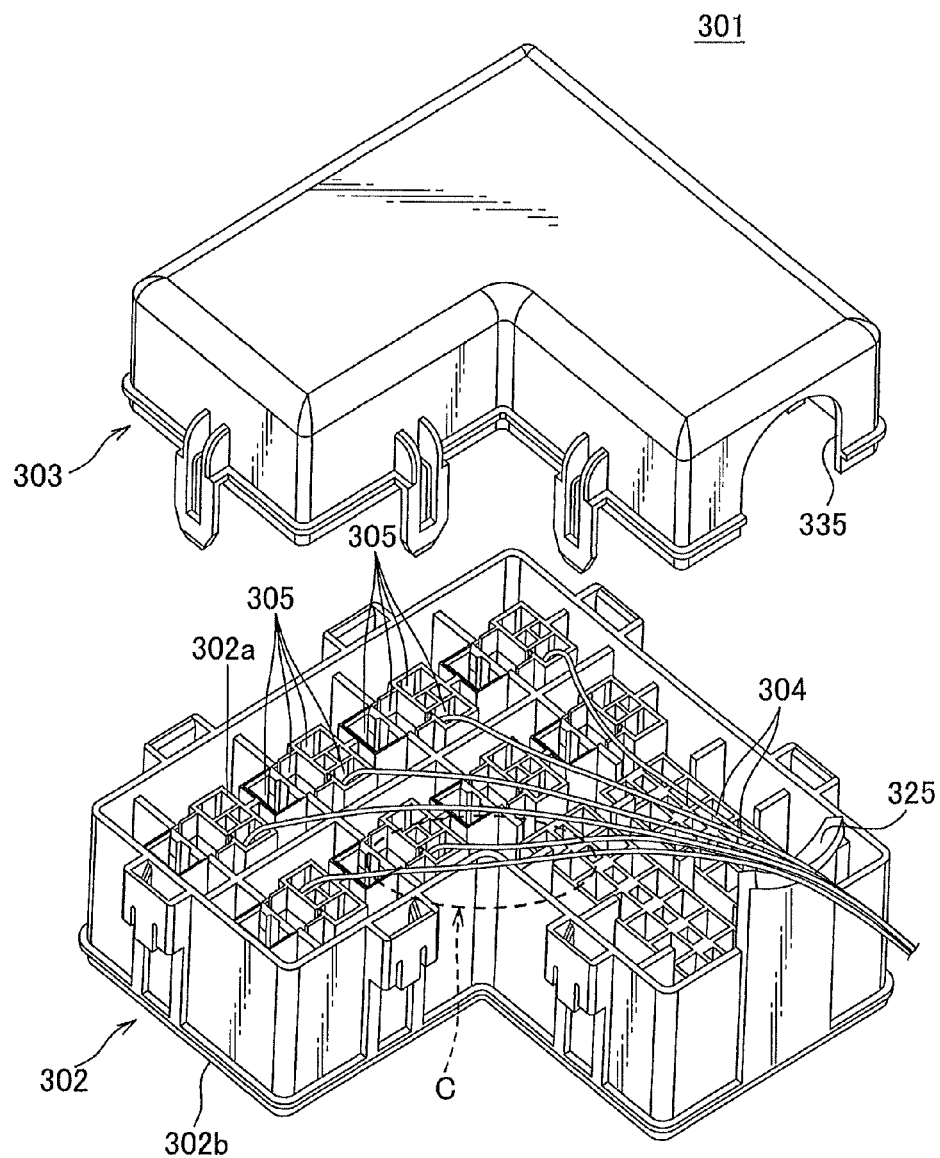
FIG. 3 is an exploded view showing a conventional electrical junction box.

Further, as shown in FIG. 2, a line B connecting a wire inlet of the wire receiver 5 located at the other end of the case main body 2 and the projecting piece 25, namely, the wire outlet passes through an outside of the case main body 2. Namely, when the electric wire 4 of which the end is received in the wire receiver 5 located at the other end of the case main body 2 is routed straight toward the projecting piece 25 like the line B, the electric wire 4 is extruded out of the case main body 2. For preventing the electric wire 4 from being bitten caused by this extrusion, in this electrical junction box 1, the receiving groove 7 is provided around the portion of the line B outside of the case main body 2, namely, around the bent portion of the case main body 2, and the biting prevention piece 6 is provided at a position of the lower cover 3 corresponding to the bent portion.

The lower cover 3 includes: a bottom wall 30 facing the lower surface 2a of the case main body 2; a peripheral wall 31 extended vertically from the bottom wall 30; a plurality of locking arms 34 provided on an outer surface of the peripheral wall 31 around an edge 32; a notch 35 provided on the peripheral wall 31 and extended from the edge 32 of the peripheral wall 31; a circular projection 33 provided on the outer surface of the peripheral wall 31 throughout a whole circumference (except for the notch 35) of the edge 32; and the biting prevention piece 6 projected in a plate shape from the edge 32 of the peripheral wall 31 toward the lower surface 2a of the case main body 2.

When such a lower cover 3 is moved close to the lower surface 2a of the case main body 2, firstly, a tip of the biting prevention piece 6 is inserted into the receiving groove 7. When the lower cover 3 is further moved close to the lower surface 2a of the case main body 2, the edge 32 of the peripheral wall 31 is positioned inside of the peripheral wall 21 of the case main body 2, and the circular projection 33 abuts on the edge 22 of the peripheral wall 21. Further, at the same time when the circular projection 33 abuts on the edge 22, the locking arms 34 are respectively locked with the locking portions 24. In this way, the lower cover 3 is attached to the case main body 2. Further, when the lower cover 3 is attached to the case main body 2, the projecting piece 25 is positioned in the notch 35, and the wire outlet is formed by the projecting piece 25 and the notch 35.

Further, when the lower cover 3 is attached to the case main body 2, previously, the end of the electric wire 4 having the terminal is inserted into the wire receiver 5, and this electric wire 4 is routed toward the projecting piece 25. This wire insertion operation can be done easily because there is no obstruction around the wire receiver 5. Then, while the biting prevention piece 6 pushes aside the electric wires 4 to an inside of the case main body 2, the tip of the biting prevention piece 6 is inserted into the receiving groove 7. In this way, when the tip of the biting prevention piece 6 is inserted into the receiving groove 7, the case main body 2 and the lower cover 3 are positioned to each other, and the locking arms 34 respectively face the locking portions 24. Then, when the biting prevention piece 6 is further inserted into a rear side of the receiving groove 7, the locking arms 34 are respectively locked with the locking portions 24, and the lower cover 3 is attached to the case main body 2.

As described above, according to the electrical junction box 1, the biting prevention piece 6 is provided not on the case main body 2, but on the lower cover 3. Therefore, the electric wire 4 can be easily inserted into the wire receiver 5 of the case main body 2. Further, while the biting prevention piece 6 pushes aside the electric wires 4 to an inside of the case main body 2, the lower cover 3 can be easily attached to the case main body 2 without the electric wires 4 being bitten between the case main body 2 and the lower cover 3. Further, when the biting prevention piece 6 is received in the receiving groove 7 of the case main body 2, the electric wires 4 pushed aside are surely prevented from being extruded out of the case main body 2. In this way, according to the electrical junction box 1, the electric wires 4 can be easily inserted into the wire receivers 5 of the case main body 2, and the electric wires 4 are surely prevented from being bitten.

Incidentally, in the electrical junction box 1 of this embodiment, only one biting prevention piece 6 is provided on a position of the lower cover 3 corresponding to the bent portion of the case main body 2. However, the prevent invention is not limited to this. A plurality of biting prevention pieces 6 may be provided on a plurality of positions other than the above position. Further, when the electric wire 4 is routed in between the upper surface 2b of the case main body 2 and the upper cover, the biting prevention piece 6 may be provided on the upper cover.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST 1 electrical junction box
2 case main body
2a lower surface
3 lower cover (cover)
4 electric wire
5 wire receiver
6 biting prevention piece
7 receiving groove (receiving space)
21 peripheral wall
32 edge

What is claimed is:
1. An electrical junction box comprising:
a case main body having a plurality of walls and a bottom wall is provided with a wire receiver for receiving an end of an electric wire and of which an inside of a peripheral wall is provided with a receiving space for receiving a biting prevention piece; and
a cover for covering the case, the biting prevention piece being projected from an edge of the cover toward the bottom wall,
wherein the electric wire is routed in between the bottom wall and the cover,
wherein after a tip of the biting prevention piece is inserted into the receiving space, the biting prevention piece pushes aside the electric wire to an inside of the case body to prevent the wire from being bitten and the cover is attached to the case main body, and
wherein the receiving space is a receiving groove defined by an inner surface of the peripheral wall and the other walls of the case main body.
2. The electrical junction box as claimed in claim 1,
wherein a line connecting a wire inlet of the wire receiver and a wire outlet of the case main body passes through an outside of the case main body, and
wherein the receiving groove is provided around the line which is outside of the case main body.

* * * * *